Patented Sept. 4, 1934

1,972,390

UNITED STATES PATENT OFFICE 1,972,390

PRODUCTION OF EXPANDED VERMICULITE

Carl S. Miner, Glencoe, Ill., assignor, by mesne assignments, to National Vermiculite Products Corporation, Chicago, Ill., a corporation of Illinois No Drawing. Application November 2, 1931, Serial No. 572,734

14 Claims. (Cl. 91—70)

The mineral vermiculite has long been known for its capacity to expand greatly upon heating and such distended material has been manufactured commercially, in a small way at least, by merely breaking up the mineral into particles of small size and subjecting them to an elevated temperature in a rotary kiln or other convenient heating apparatus.

The product resulting from such dry-heat calcining operation, because of its low density, has found use to some degree in the building industry, for example, as a heat and sound insulating material, but it has certain serious disadvantages, the principal one being its friability, which results in the formation of dust when it is handled, and another is its tendency to absorb water or moisture.

One object of the present invention is to provide a process or method for expanding the vermiculite or other similar mineral which will produce a swelled or enlarged product free from these undesirable characteristics, and this is accomplished by introducing the vermiculite, or equivalent expansible mineral, into a liquid heated to a temperature in excess of that of the boiling point of water.

The reason for the expansion of vermiculite when heat is applied to it is that it contains a substantial quantity of water which is suddenly transformed into steam by the application of the heat and the pressure of the generated steam expands the particles of the mineral.

When this puffing or expansion takes place in a hot liquid, such, for example, as a paraffin oil, the resultant porous mass of vermiculite is instantly impregnated or coated by the oil or other liquid, and it is therefore possible in this way to produce in one operation an expanded vermiculite waterproofed by oil, rosin, asphalt, pitch, synthetic resin, or other suitable substance having a boiling point higher than that of water.

This method yields a product substantially free from the inclination to form dust or powder when handled in the ordinary way in commercial processes, and it affords an efficient means of coating the expanded vermiculite when it is desired to use it for molding processes in combination with a binder, such, for instance, as pitch or asphalt, for the production of electrical insulation and other types of molded products, since, by this means, the vermiculite can be expanded in a single operation and at the same time mixed with a binder ready for the molding operation, it being merely necessary to select particles initially of proper size.

Vermiculite expanded and waterproofed by this new process is useful in many other ways and it is superior to such mineral, swelled by other methods, in those uses where a waterproof or water-resistant material of good heat and sound insulating value is needed, as, for example, a filler for walls or light-weight filler for cement or plaster products.

As indicated above, a wide range of liquids may be employed in practicing this process, and, as an example of the method of operation, ordinary asphalt may be heated to a temperature of about 400° Fahrenheit, whereupon raw vermiculite of a particle size, of approximately one-fourth inch, is introduced at a considerable distance below the surface of the liquid and the vermiculite will be instantly expanded, and, at the same time, impregnated and charged with the asphalt.

This product, because of its low specific gravity, rises to the surface of the liquid, unless mechanically prevented from so doing, and it may be readily removed by skimming it off.

The resulting product will consist of expanded, waterproof particles of irregular shape and of comparatively low density having special value as heat and sound insulating material where a waterproof product is necessary.

These particles or pieces may also be utilized as a raw material in molding operations by introducing them into molds and applying suitable pressure by means of the ordinary hydraulic or mechanical presses.

It will be understood that the invention may be applied in the production of expanded vermiculite in any case where it is desired to impregnate or coat it with any substance capable of being rendered fluid by heat. Glycerine or calcium chloride, might be used if it were desired to produce a water attractile rather than waterproof, expanded vermiculite.

In cases where it is desirable to use a synthetic resin binder for the expanded vermiculite, one constituent of the synthetic resin may be used as an expanding medium and the resin may subsequently be formed in situ.

For instance, the vermiculite may be expanded in hot phenol and the distended or enlarged, phenol-impregnated vermiculite may subsequently be treated with formaldehyde, furfural, or other compound capable of producing a resin with phenol.

It is also possible to utilize as the expanding medium, liquid substances which do not impregnate the expanded vermiculite, such, for example, as fused metals, glass, or other substances incapable of substantial penetration into the enlarged vermiculite.

The expanded vermiculite may be removed, or, in those instances where it is desirable to do so, it may be allowed to remain during the solidification of the expanding medium to form a new product consisting, for example, of a mass of glass or of asphalt containing particles of expanded vermiculite, and such product, unless prevented because of its low specific gravity, rises to the surface of the liquid and may be readily removed.

Those acquainted with this art will readily appreciate that the invention herein set forth and defined by the appended claims is not necessarily limited and restricted to the precise and exact details of procedure outlined, and that changes may be incorporated therein without departure from the principles of the invention and without the loss or sacrifice of any of its material benefits.

I claim:

1. The process of exfoliating a mineral of the vermiculite group by heat and simultaneously impregnating it with a water-resistant material.

2. The process of exfoliating a mineral of the vermiculite group by heat and simultaneously impregnating it with a water-attractile material.

3. The process of exfoliating a mineral of the vermiculite group by heat and simultaneously impregnating it with a liquid capable of such impregnation.

4. The process of exfoliating and simultaneously impregnating a mineral of the vermiculite group consisting in raising the temperature of the unexfoliated mineral to exfoliation degree while in and by a liquid heated sufficiently to effect such exfoliation and capable of impregnating the exfoliated mineral.

5. The process set forth in claim 4 including the step of removing the exfoliated impregnated mineral from the liquid.

6. The process of exfoliating and simultaneously impregnating a mineral of the vermiculite group consisting in immersing the unexfoliated mineral in an impregnating liquid heated to a temperature above the exfoliation temperature of the mineral.

7. The process set forth in claim 6 including the step of removing the exfoliated impregnated mineral from the liquid.

8. The process set forth in claim 4 in which the liquid is water-resistant.

9. The process set forth in claim 6 in which the liquid is water-resistant.

10. The process set forth in claim 4 in which the liquid is moisture-attractile.

11. The process set forth in claim 6 in which the liquid is moisture-attractile.

12. The process set forth in claim 4 in which the liquid is water-resistant and including the step of removing the exfoliated impregnated mineral from the liquid.

13. The process set forth in claim 4 including the step of permitting the liquid and its contained exfoliated impregnated mineral to cool sufficiently to effect solidification of the liquid.

14. The process set forth in claim 6 including the step of permitting the liquid and its contained exfoliated impregnated mineral to cool sufficiently to effect solidification of the liquid.

CARL S. MINER.